US010523714B2

(12) United States Patent
Hussain et al.

(10) Patent No.: US 10,523,714 B2
(45) Date of Patent: *Dec. 31, 2019

(54) DEVICE POLICY COMPOSITION AND MANAGEMENT SYSTEM

(71) Applicant: Amazon Technologies, Inc., Seattle, WA (US)

(72) Inventors: Amjad Hussain, Bellevue, WA (US); Anand Doshi, Bellevue, WA (US); Xiong Wang, Redmond, WA (US); Sivaprasad Padisetty, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,137

(22) Filed: Oct. 22, 2018

(65) Prior Publication Data
US 2019/0068646 A1 Feb. 28, 2019

Related U.S. Application Data

(63) Continuation of application No. 15/279,122, filed on Sep. 28, 2016, now Pat. No. 10,110,635.

(51) Int. Cl.
*H04L 29/06* (2006.01)

(52) U.S. Cl.
CPC ............ *H04L 63/20* (2013.01); *H04L 63/105* (2013.01); *H04L 63/205* (2013.01)

(58) Field of Classification Search
CPC ...................................................... H04L 63/20
See application file for complete search history.

(56) References Cited

U.S. PATENT DOCUMENTS

| 6,381,639 B1 * | 4/2002 | Thebaut | G06F 21/30 709/221 |
| 7,751,628 B1 * | 7/2010 | Reisman | G11B 27/034 382/232 |

(Continued)

OTHER PUBLICATIONS

Burns et al.; Automatic management of network security policy; Published in: Proceedings DARPA Information Survivability Conference and Exposition II. DISCEX'01; Date of Conference: Jun. 12-14, 2001; IEEE Xplore (Year: 2001).*

(Continued)

*Primary Examiner* — Bradley W Holder
(74) *Attorney, Agent, or Firm* — Knobbe Martens Olson & Bear LLP (57) ABSTRACT

A policy management system is described herein that allows an administrator to compose custom policies that can be applied to target devices and that achieve tasks specific to the administrator's organization and network. The composed policies can be standalone policies that are applied independently or sequenced policies that are applied in a specified order. A composed policy may be associated with one or more targets and stored in a policy database. A target device may periodically query the policy management system for any policies that pertain to the target device. If policies have been composed that pertain to the target device and such policies have been updated or have not been previously transmitted to the target device, the policy management system can retrieve the policies from the policy database, merge the policies, and transmit the merged policies to the target device. The target device can then apply the merged policies.

20 Claims, 6 Drawing Sheets

(56) References Cited

U.S. PATENT DOCUMENTS

| | | | | |
|---|---|---|---|---|
| 7,778,963 B2* | 8/2010 | Novik | G06F 16/1844 707/610 |
| 8,935,365 B1* | 1/2015 | Levin | G06F 21/604 709/220 |
| 9,047,334 B1* | 6/2015 | Cheriton | G06F 16/2308 |
| 9,641,392 B2* | 5/2017 | Anderson | H04L 67/10 |
| 9,740,703 B2* | 8/2017 | Lim | G06F 21/6218 |
| 2003/0023573 A1* | 1/2003 | Chan | G06N 5/022 706/47 |
| 2007/0282982 A1* | 12/2007 | Childress | H04L 41/0893 709/223 |
| 2012/0017258 A1* | 1/2012 | Suzuki | G06F 21/604 726/1 |
| 2014/0019605 A1* | 1/2014 | Boberg | H04L 41/0893 709/223 |
| 2016/0072676 A1* | 3/2016 | Gomadam | H04L 41/12 709/221 |
| 2016/0253195 A1* | 9/2016 | Banzhaf | G06F 9/5077 718/1 |
| 2017/0109187 A1* | 4/2017 | Cropper | G06F 1/3234 |

OTHER PUBLICATIONS

Greenberg et al.; A clean slate 4D approach to network control and management; Published in: Newsletter ACM SIGCOMM Computer Communication Review Homepage archive; vol. 35 Issue 5, Oct. 2005; pp. 41-54; ACM Digital Library (Year: 2005).*

Garfinkel et al.; Terra: a virtual machine-based platform for trusted computing; Published in: Proceeding SOSP '03 Proceedings of the nineteenth ACM symposium on Operating systems principles; pp. 193-206; 2003; ACM Digital Library (Year: 2003).

Luo et al.; Virtualization security for cloud computing service; Published in: Cloud and Service Computing (CSC), 2011 International Conference on; Date of Conference: Dec. 12-14, 2011; 2011; IEEE Xplore (Year: 2011).

* cited by examiner

DEVICE POLICY COMPOSITION AND MANAGEMENT SYSTEM

CROSS-REFERENCE TO RELATED APPLICATIONS

This application is a continuation of U.S. patent application Ser. No. 15/279,122, entitled "DEVICE POLICY COMPOSITION AND MANAGEMENT SYSTEM" and filed on Sep. 28, 2016, which is hereby incorporated by reference herein in its entirety.

BACKGROUND

Generally described, organizations operate computer networks that interconnect numerous computing systems in support of the organizations' operations. For example, the computer networks may interconnect laptops, desktops, mobile devices, and other such computing systems. In addition, the computer networks can support virtualization technologies that allow a single physical computing machine to host one or more instances of virtual machines that appear and operate as independent computing systems to a connected computer user. For example, the computer networks may interconnect numerous virtual machine instances and/or physical computing systems in support of the organizations' operations.

Each of the physical computing systems and/or virtual machine instances may be used and configured by separate users. Often, organizations implement computer-based security measures to prevent data loss or malicious cyber intrusions and/or to ensure compatibility with other systems. However, given the variability in how different users use and configure the physical computing systems and/or virtual machine instances, it may be difficult to enforce the computer-based security measures.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

As described above, it may be difficult to enforce computer-based security measures on physical computing systems and/or virtual machine instances that are interconnected via a network. For example, an administrator of an organizational network may implement a policy that controls all interconnected physical computing systems and/or virtual machine instances coupled to the network to enforce the desired security measures. As another example, a policy may define a configuration for computing systems and/or virtual machine instances, including what software or applications are installed on the computing systems and/or virtual machine instances. An example policy may be an instruction set (e.g., a script) that, when executed, causes the executing physical computing systems and/or virtual machine instances to have a desired property or characteristic (e.g., the installation of a particular application, like an anti-virus application). The administrator may operate a central server that pushes the policy to the various physical computing systems and/or virtual machine instances, and the physical computing systems and/or virtual machine instances may execute the received policy (e.g., run the set of instructions that define the policy). Alternatively, the physical computing systems and/or virtual machine instances may poll for policies, including changes to policies, to determine if changes to the physical computing systems and/or virtual machine instances are necessary. As used herein, a target may refer to a physical computing system, a virtual machine instance, or any other device or system that receives a policy from a server for execution.

A policy, however, may be pre-defined by a third party entity and not customizable to the needs of the administrator's organization. This can be problematic if the organization has sophisticated needs that are not satisfied by any one available policy. For example, no one policy may include a set of instructions that, when executed, causes a target to satisfy the organizational needs. As one potential solution, an administrator may therefore apply multiple policies to the same target to satisfy the organizational needs. Conventional policy administering systems, though, do not provide a mechanism to define the order in which the policies are applied, which can be critical for the successful implementation of the desired security measures. As another potential solution, an administrator may generate a custom script that satisfies the organizational needs. However, the administrator may then have to spend the time to run the custom script manually on each individual target. If the custom script is composed of multiple policies and one of the policies is updated, then the administrator would have to manually update the appropriate portion of the custom script and manually run the updated custom script on each individual target once again.

In addition, third party policies may merely cause a set of instructions to execute without providing any feedback or remedial action. For example, these policies may not identify and/or implement actions that should be taken if one or more instructions of a policy fail to execute, conflicts arise between two or more different policies that are applied to the same target, one or more targets otherwise fail to comply with a policy, and/or the like. A conventional policy administering system may have to individually analyze each target to determine whether the respective target is in compliance with the appropriate policies and, if not, determine actions to take to remedy the situation. Such analysis may be computer resource intensive, both for the conventional policy administering system and the targets, causing computer resources to be diverted from other important tasks.

Thus, described herein is a policy management system that allows an administrator to compose custom policies that can be applied to targets and that achieve tasks specific to the administrator's organization and network. The custom policies can be standalone policies that are applied independently or sequenced policies that are applied in a specified order. For example, an administrator can compose a policy that includes various plugins (e.g., instructions) and/or references to other policies. A plugin may be a smallest unit of a policy state on a target. Example plugins can include a domain join instruction (e.g., an instruction that, when executed, causes a target to join a particular domain with specific user credentials), a machine software inventory collection instruction (e.g., an instruction that, when executed, causes a target to generate a list of installed applications), an application installation instruction (e.g., an instruction that, when executed, causes a target to install a task execution application, an anti-virus application, a browser application, an application update, etc.), a script execution instruction (e.g., an instruction that, when executed, causes a target to execute a script that defines an administrative task), and/or the like. The administrator can specify the order in which selected plugins are executed when a policy is applied. The administrator can also reference one or more other policies such that the policies are nested within the policy being composed and are applied as part of the application of the policy being composed. Optionally, the administrator can specify a policy that should be applied after and/or before the policy being composed. The custom policies can be further organized in multiple layers such that one policy is applied to all targets, a second policy is applied to a subset of all of the targets, and so on. In addition, the policy management system may allow for merging multiple policies, for example so that multiple policies are run efficiently or the same instructions are not duplicated. A composed policy may be associated with one or more targets and stored in a policy database.

A target may execute an agent application that periodically queries the policy management system for any policies that pertain to the target. If policies have been composed that pertain to the target and such policies have been updated or have not been previously transmitted to the target, the policy management system can retrieve the policies from the policy database, merge the policies, and transmit the merged policies to the target. The policy management system may merge the policies by taking each policy to be applied to a target and combining such policies into a single policy. The policy management system may merge the policies for efficiency purposes. For example, two policies to be applied to a target may include the same plugin. Thus, the policy management system can perform a deduplication operation to remove the redundant plugin from one of the policies, thereby reducing the amount of memory necessary to store the policies and the computer processing resources necessary to apply the policies. As another example, two policies to be applied to a target may have conflicting plugins. One plugin in a first policy may cause a target to install a first application, whereas another plugin in a second policy may cause the target to uninstall the first application. Thus, the policy management system can remove both plugins during the merging process to reconcile the conflict. As another example, a policy to be applied to a target may be updated, while other policies to be applied to the target remain unchanged. The policy management system can use the merging process to create an updated single policy such that the target does not have to determine which policies are updated and which policies are not updated and how any updates may affect the overall application of the policies.

Once a target receives the merged policies, the agent application can apply the policies and transmit results of the application to the policy management system. For example, results can include an indication that all policies were successfully applied, an indication that one or more policies were not successfully applied (and an identification of which ones failed), an indication that a conflict occurred (e.g., a target has an application installed that is now banned by one or more policies), and/or the like. If the application results indicate anything other than an indication that all policies were successfully applied, the policy management system can take automatic remedial action or notify an administrator of the application results and await instructions from the administrator. For example, the policy management system can automatically quarantine a target from the network, detach the target from the network, instruct the target to attempt to reapply the failed policy, resolve the conflict (e.g., uninstall the installed application if the installed application is now banned by one or more policies), and/or the like. The target may also provide feedback on the application of the policies (e.g., a time it took to apply the policies, CPU usage during policy application, memory usage during policy application, etc.) and the policy management system can use the feedback from one or more targets to improve the policy merging operations to take advantage of any identified efficiencies and/or to prevent any identified inefficiencies. Additional details of the operations performed by the policy management system and the targets are described below with respect to FIGS. 1-6.

Example Policy Management Environment

Figure 1:
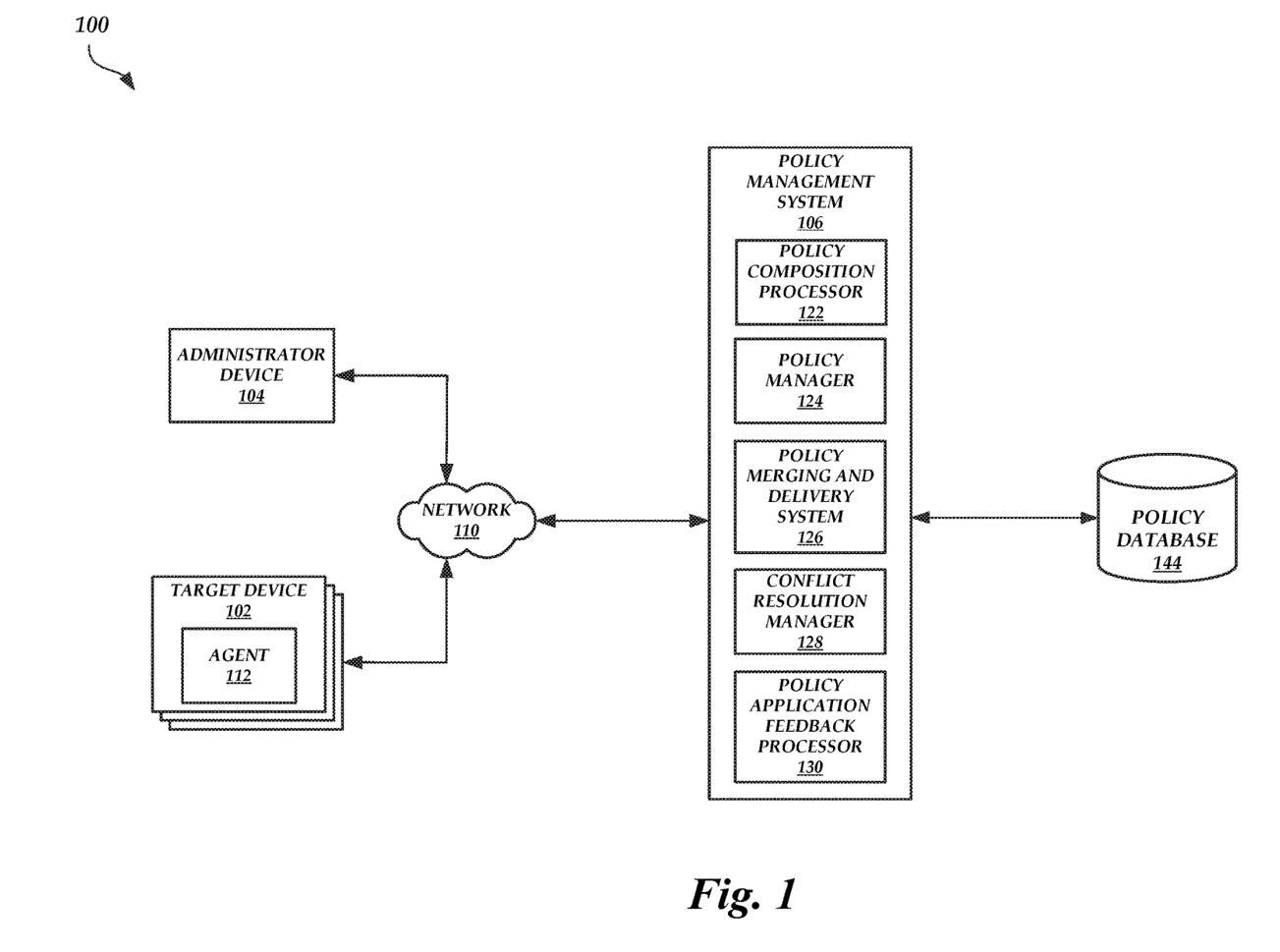
FIG. 1 is a block diagram of a policy management environment, according to one embodiment.

FIG. 1 is a block diagram of a policy management environment 100, according to one embodiment. As illustrated in FIG. 1, the policy management environment 100 includes target devices 102, an administrator device 104, a policy management system 106, and a policy database 144. In an embodiment, the target devices 102 and the administrator device 104 are in communication with the policy management system 106 via a network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The policy management system 106 may include several components, including a policy composition processor 122, a policy manager 124, a policy merging and delivery system 126, a conflict resolution manager 128, and a policy application feedback processor 130. The policy composition processor 122 may be configured to generate policy files based on information provided by the administrator device 104. For example, the policy composition processor 122 can generate a network page accessible by the administrator device 104 (e.g., a browser application running on the administrator device 104) via the network 110 that allows the administrator device 104 to provide the information used to compose a policy and generate the policy file. As another example, the administrator device 104 can run a command line interface application that transmits to the policy composition processor 122 the information used to compose the policy and generate the policy file (e.g., as an application programming interface (API) call).

The policy composition processor 122 may allow an administrator via the administrator device 104 to compose a policy by specifying plugins, custom instructions (e.g., administrator-created plugins), and/or references to other policies to include in the policy. The administrator device 104 can specify parameters for the plugins or the target device 102 can provide parameters for the plugins when the policy is applied. The administrator device 104 may also specify to the policy composition processor 122 a name of the policy, which administrators have permission to access the policy, and an identification of one or more target devices 102 to which the policy will be bound. For example, an identity management system (not shown) may store a list of administrators (or other users) and the policy access permissions associated with each administrator. Before an administrator device 104 is allowed to access (e.g., read, write, delete, etc.) an existing policy file (e.g., for updating purposes), the identity management system may use user credentials (e.g., login and password) provided by the administrator to verify that the administrator or user is authorized to access and/or edit the existing policy file. If the administrator is not authorized, the identity management system may indicate to the policy management system 106 that access is denied, and the policy management system 106 may then deny the access request. Otherwise, the policy management system 106 may grant access to the existing policy file. As described in greater detail below, an administrator can select a target device 102 to bind to a policy after the target device 102 has indicated to the policy manager 124 that the target device 102 is available to be bound to policies.

The administrator device 104 can further specify to the policy composition processor 122 an order in which the plugins, custom instructions, and/or referenced policies included in the composed policy should be applied or executed. If a policy is referenced in the composed policy, then the referenced policy may be applied to the target device 102 before the subsequent plugin, custom instruction, and/or referenced policy included in the composed policy is applied or executed.

As a default, a composed policy may be considered idempotent (e.g., the policy can be applied to a target device 102 independent of other policies any number of times without changing the result of applying the policy beyond the initial application). In other words, policies may be composed such that they can be applied effectively to a target device 102 in any order. Optionally, the administrator device 104 can indicate to the policy composition processor 122 an order in which policies should be applied. For example, the policy database 144 may store one or more policy files. The policy composition processor 122 can retrieve, from the policy database 144, a list of the stored policy files and present this list to the administrator device 104. An administrator can view the list and select a policy that should be applied after and/or before another policy. Thus, the administrator device 104 can provide to the policy composition processor 122 an indication of the policy that should be applied after and/or before another policy. In alternate embodiments, the policy composition processor 122 retrieves, from the policy database 144, only a list of stored policy files that are associated with the target device 102 bound to the composed policy and a selection is made from this list. The indication of the policy that should be applied after and/or before the composed policy can be stored as metadata in the composed policy file. The policy merging and delivery system 126 can process the metadata to determine the sequence in which policies should be applied for the purpose of generating the single, merged policy file (also referred to herein as an effective policy file). This may include the policy merging and delivery system 126 running each of the policies on test or non-customer computing resources to determine how the policies should be merged, including whether running policies in a certain order cause errors, whether certain parts of a policy can be removed without altering the intended state, etc. Based thereon, the policy merging and delivery system 126 can determine the merged policy file, or effective policy file.

Once a policy is composed, the policy composition processor 122 can package the policy into a policy file and store the policy file in the policy database 144. Optionally, the policy database 144 also stores an identification of the target devices 102 bound to the policy file. As described above, the policy file can include metadata indicating a sequence of policies to apply to a target device 102. Alternatively, the metadata can be stored in the policy database 144 separate from the policy file.

The target devices 102 can execute an agent 112 (e.g., an application) that manages the application of policies. For example, the agent 112 may have administrative privileges that allow the agent 112 to apply policies to the target device 102. The agent 112 can initially transmit a message to the policy manager 124 (e.g., as an API call) indicating an availability of the target device 102 to be bound to policies. The indication may include attributes of the target device 102, including an operation system that is running on the target device 102, available and/or total disk space, processor speed, and/or the like. Upon receiving this indication, the policy manager 124 can notify the policy composition processor 122 that the target device 102 is available to be bound to policies and the policy composition processor 122 can include the target device 102 in a list of target devices 102 that can be bound to composed policies.

In an embodiment, the policy composition processor 122 uses the target device 102 attributes to determine whether the target device 102 is listed as being available to be bound to a particular policy. For example, a policy may include plugins, custom instructions, and/or referenced policies that are incompatible with the target device 102. The policy composition processor 122 can use the target device 102 attributes to determine if the target device 102 is compatible with the composed policy. If the target device 102 is compatible with the composed policy, then the policy composition processor 122 lists the target device 102 as a target that can be bound to the composed policy. Otherwise, if the target device 102 is incompatible with the composed policy, then the policy composition processor 122 does not list the target device 102 as being a target that can be bound to the composed policy and/or includes a notice that the target device 102 cannot be bound to the composed policy (and/or an indication of why the target device 102 is incompatible with the composed policy).

After the agent 112 indicates the binding availability, the agent 112 can periodically transmit requests (e.g., as API calls) to the policy merging and delivery system 126 for policies that pertain to the target device 102. The time period between policy requests may be determined by the agent 112, the administrator device 104, and/or the policy management system 106. When a policy request is received from the agent 112, the policy merging and delivery system 126 can query the policy database 144 to identify any policy files that pertain to the target device 102. If no policy files are stored in the policy database 144 that pertain to the target device 102, then the policy merging and delivery system 126 does not respond to the policy request. If one or more policy files are stored in the policy database 144 that pertain to the target device 102, then the policy merging and delivery system 126 determines whether the policy files should be transmitted to the target device 102. For example, if a stored policy file has never been transmitted to the target device 102, then the policy merging and delivery system 126 determines that the policy file should be transmitted to the target device 102. If a stored policy file has been transmitted to the target device 102 at a previous time as part of a merged file, but has been modified since the policy file was last transmitted to the target device 102, then the policy merging and delivery system 126 determines that the policy file should be transmitted to the target device 102. If a stored policy file has been transmitted to the target device 102 at a previous time as part of a merged policy file and has not changed since the policy file was last transmitted to the target device 102, then the policy merging and delivery system 126 determines that the policy file should not be transmitted to the target device 102. When the policy merging and delivery system 126 determines that the policy file(s) should be transmitted to the target device 102, the policy merging and delivery system 126 retrieves the appropriate policies. When the policy merging and delivery system 126 determines that the policy file(s) should not be transmitted to the target device 102, the policy merging and delivery system 126 can transmit a message to the agent 112 instructing the agent 112 to apply the previously sent merged policy (e.g., the agent 112 or memory of the target device 102 may store one or more merged policy files received from the policy management system 106).

The policy merging and delivery system 126 can be configured to package policy files for transmission to the agent 112. For example, if a single policy file pertains to the target device 102, then the policy merging and delivery system 126 retrieves the policy file from the policy database 144, packages the policy file for transmission to the agent 112 (e.g., in an JavaScript Object Notation format), and transmits the packaged policy file to the agent 112 via the network 110.

On the other hand, if two or more policy files pertain to the target device 102, then the policy merging and delivery system 126 can be configured to merge the policy files into a single policy file, package the single policy file for transmission to the agent 112, and transmit the packaged single policy file to the agent 112 via the network 110. For example, the policy merging and delivery system 126 may merge the policy files by taking the plugins, custom instructions, and/or referenced policies included in each policy to be applied to the target device 102, optionally modifying one or more policies, and combining the modified policies into a single policy. As another example, the policy merging and delivery system 126 may merge the policy files by keeping each policy file separate, but packaging each of the policy files in the same message transmitted to the agent 112. The policy merging and delivery system 126 may optionally modify one or more policies before including the policy files in the packaged message. The agent 112 may apply the policies in the order that the policy files are included in the packaged message. As another example, the policy merging and delivery system 126 may merge the policy files by packaging each policy file in a separate message and transmitting each message to the agent 112. The policy merging and delivery system 126 may optionally modify one or more policies before including the policy files in the individual messages. The agent 112 may apply the policies in the order that the messages are received (e.g., the order that the policy files are received).

The policy merging and delivery system 126 may modify policies in at least one of several ways. For example, two policy files to be applied to the target device 102 may include the same plugin. Thus, the policy merging and delivery system 126 can perform a deduplication operation to remove one of the redundant plugins, thereby reducing the amount of memory necessary for the target device 102 to store the eventual single policy file (or single packaged message or series of packaged messages) and reducing the computer processing resources expended by the agent 112 to apply the policies. As another example, two policies to be applied to the target device 102 may have conflicting plugins. Conflicting plugins may be plugins that cause the target device 102 to perform a first operation and then to perform a second operation that is the opposite of the first operation (e.g., one plugin in a first policy file may cause the target device 102 to install a first application, whereas another plugin in a second policy file may cause the target device 102 to uninstall the first application; one plugin in a first policy file may cause the target device 102 to upgrade an application to a new version, whereas another plugin in a second policy file may cause the target device 102 to downgrade the application to the original version; etc.). Thus, the policy merging and delivery system 126 can remove both plugins during the merging process to reconcile the conflict (e.g., the single policy file may not include either plugin). Alternatively, the policy merging and delivery system 126 can determine which policy is the most recent, keep the plugin associated with the most-recent policy, and discard the plugin associated with the other, least-recent policy. As another example, a policy may be incompatible with the target device 102 as determined based on the target device 102 attributes provided by the target device 102, as described above. Instead of sending the policy to the target device 102, which could result in an error, the policy merging and delivery system 126 can remove the entire policy from the single policy file or the packaged message or not transmit the policy in a separate message. As another example, a policy to be applied to the target device 102 may be updated (e.g., by an administrator device 104), while other policies to be applied to the target device 102 remain unchanged. The policy merging and delivery system 126 can retrieve a previously transmitted single policy file (e.g., from the policy database 144, from internal memory or a cache of the policy management system 106, etc.) and update the single policy file using the updated policy. Alternatively, the policy merging and delivery system 126 can determine a new single policy file using the updated policy and the unchanged policies.

The policy merging and delivery system 126 may analyze any available metadata associated with a policy file to determine the sequence in which policies are presented in the single policy file (or the sequence in which policy files are included in the packaged message, or the sequence in which messages are transmitted to the agent 112). For example, if metadata exists that indicates that a first policy should be applied before a second policy, then the policy merging and delivery system 126 may include the plugins, custom instructions, and/or referenced policies associated with the first policy before the plugins, custom instructions, and/or referenced policies associated with the second policy in the single policy file, include the first policy file before the second policy file in the packaged message, or transmit a message that includes the first policy file before transmitting a message that includes the second policy file.

On the other hand, if no metadata exists indicating a sequence of policies to apply, then the policy merging and delivery system 126 merges the policies in any order. The order can be alphabetical, time-based (e.g., a policy file that was most recently created, a policy file that was least recently created, a policy file that was most recently modified, a policy file that was least recently modified, etc.), random, and/or the like. As described above, this may also include the policy merging and delivery system 126 running each of the policies on test or non-customer computing resources to determine how the policies should be merged, including whether running policies in a certain order cause errors, whether certain parts of a policy can be removed without altering the intended state, etc. Based thereon, the policy merging and delivery system 126 can determine the merged policy file, or effective policy file.

As described above, policies can be organized in multiple layers. For example, a first policy can be bound to all target devices 102 (including a first target device 102), a second policy can be bound to a subset of the target devices 102 that includes the first target device 102, and a third policy can be bound specifically to the first target device 102. If the policy merging and delivery system 126 is preparing to send a policy to the agent 112 of the first target device 102, then the policy merging and delivery system 126 may order the policies in a specific sequence regardless of whether sequencing metadata exists. The policy merging and delivery system 126 may indicate that the global group policy (e.g., the first policy) should be applied first, the policy the next level down from the global group policy should be applied next (e.g., the second policy), and any policies bound directly to the first target device 102 (e.g., the third policy) should be applied last. The reason that the policy merging and delivery system 126 may sequence the policies in this manner is because in some situations, a group policy may conflict with a directly-bound policy. By applying the directly-bound policy last, the directly-bound policy can override the group policy if there is a conflict.

Similarly, during the merging process, the policy merging and delivery system 126 can group one or more policies together and specify an order in which the policy groups should be applied by the agent 112. For example, for policies within a group, the agent 112 may apply the policies in any order, in an order specified by the policy merging and delivery system 126 (e.g., according to metadata associated with a policy file), or in parallel (e.g., each processor of a target device 102 applies a separate policy within the group). Once the policies of one group are applied, the agent 112 can apply the policies of the next group in the specified sequence and so on until each group of policies is applied. Likewise, the policy merging and delivery system 126 can group one or more plugins, custom instructions, and/or references to other policies together and specify and specify an order in which the instruction groups should be applied by the agent 112. For example, for instructions within a group, the agent 112 may execute the plugins, custom instructions, and/or referenced policies in any order, in an order specified by the policy composition processor 122 and/or the policy merging and delivery system 126, or in parallel (e.g., each processor of a target device 102 executes a separate instruction within the group). Thus, the policy merging and delivery system 126 can group one or more policies and specify an application order of the policy groups and/or can group one or more instructions within one or more policies and specify an execution order of the grouped instructions.

Alternatively, the agent 112 can merge policies as described herein with respect to the policy merging and delivery system 126. For example, the policy merging and delivery system 126 can retrieve one or more policies bound to a target device 102 and transmit such policies to the agent 112 of the target device 102. The agent 112 can then merge the one or more policies before applying the merged policies.

Once the agent 112 receives a policy file (or policy files) from the policy merging and delivery system 126, the agent 112 can apply the policies included therein to the target device 102. The agent 112 can track the progress of the application of the policies and provide results of the applications to the conflict resolution manager 128 and/or the policy application feedback processor 130 once the applications are complete. For example, application results can include an indication that all policies were successfully applied, an indication that one or more policies were not successfully applied (and an identification of which ones failed), an indication that a conflict occurred (e.g., the target device 102 has an application installed that is now banned by one or more policies), and/or the like.

If the application results indicate anything other than an indication that all policies were successfully applied, the conflict resolution manager 128 can take automatic remedial action and/or notify the administrator device 104 of the application results and await instructions from the administrator device 104. For example, the conflict resolution manager 128 can automatically quarantine the target device 102 from the network 110, detach the target device 102 from the network 110, instruct the agent 112 to attempt to reapply the failed policy, resolve the conflict (e.g., uninstall the installed application if the installed application is now banned by one or more policies), and/or the like.

Application results can also include feedback on the application of the policies by the agent 112. For example, such feedback can include a time it took the agent 112 to apply the policies, target device 102 CPU usage during policy application, target device 102 memory usage during policy application, and/or the like. As described above, policies may be merged in different ways if the policies are idempotent. Thus, one agent 112 may receive policies merged in a first sequence, whereas another agent 112 may receive the same policies merged in a second sequence. The policy application feedback processor 130 can use the feedback from multiple agents 112 to determine which sequences resulted in less policy application time, lower CPU usage, lower memory usage, and/or the like for the purpose of improving the policy merging operations performed by the policy merging and delivery system 126. As an illustrative example, if the policy application feedback processor 130 determines that ordering policies in a first sequence instead of a second sequence results in faster policy application times, lower CPU usage, lower memory usage, and/or the like, then the policy merging and delivery system 126 may begin to merge policies in the first sequence and not the second sequence in response to future agent 112 policy requests to take advantage of the identified efficiencies.

The administrator device 104 may communicate with the policy management system 106 via a browser application running on the administrator device and/or a command line interface application running on the administrator device.

The target devices 102 and the administrator device 104 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The target devices 102 may also include virtual machine instances hosted by various physical computing machines. The target devices 102 may execute an application (e.g., the agent 112) to communicate with the policy management system 106. The administrator device 104 may execute a browser application to access a network page generated by the policy management system 106 and/or a command line interface application that communicates with the policy management system 106.

The policy management system 106 may be a single computing device or may include multiple distinct computing devices, such as computer servers, logically or physically grouped together to collectively operate as a server system. The components of the policy management system 106 can each be implemented in application-specific hardware (e.g., a server computing device with one or more ASICs) such that no software is necessary, or as a combination of hardware and software. In addition, the modules and components of the policy management system 106 can be combined on one server computing device or separated individually or into groups on several server computing devices. In some embodiments, the policy management system 106 may include additional or fewer components than illustrated in FIG. 1.

In some embodiments, the features and services provided by the policy management system 106 may be implemented as web services consumable via the communication network 110. In further embodiments, the policy management system 106 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The policy management system 106 and the target devices 102 can be part of the same computing infrastructure. For example, the policy management system 106 and one or more of the target devices 106 can be implemented within a hosted computing environment and the policy management system 106 and one or more of the target devices 102 can communicate with each other via a network internal to the hosted computing environment. Alternatively, the policy management system 106 and the target devices 102 can be part of different computing infrastructures. For example, one or more of the target devices 102 may reside on-prem (e.g., a target device 102 may be located on the premise of the user or entity operating the target device 102), whereas the policy management system 106 may reside in a hosted computing environment. The target devices 102 (e.g., the agents 112) and the policy management system 106 may then communicate via a network external to the hosted computing environment.

The policy database 144 may be located external to the policy management system 106. For example, the policy database 144 may be stored and managed by a separate system or server and may be in communication with the policy management system 106 via a direct connection or an indirect connection (e.g., via a network, such as the network 110). In other embodiments, not shown, the policy database 144 is located within the policy management system 106.

Example Block Diagram for Managing Policies

Figure 2:
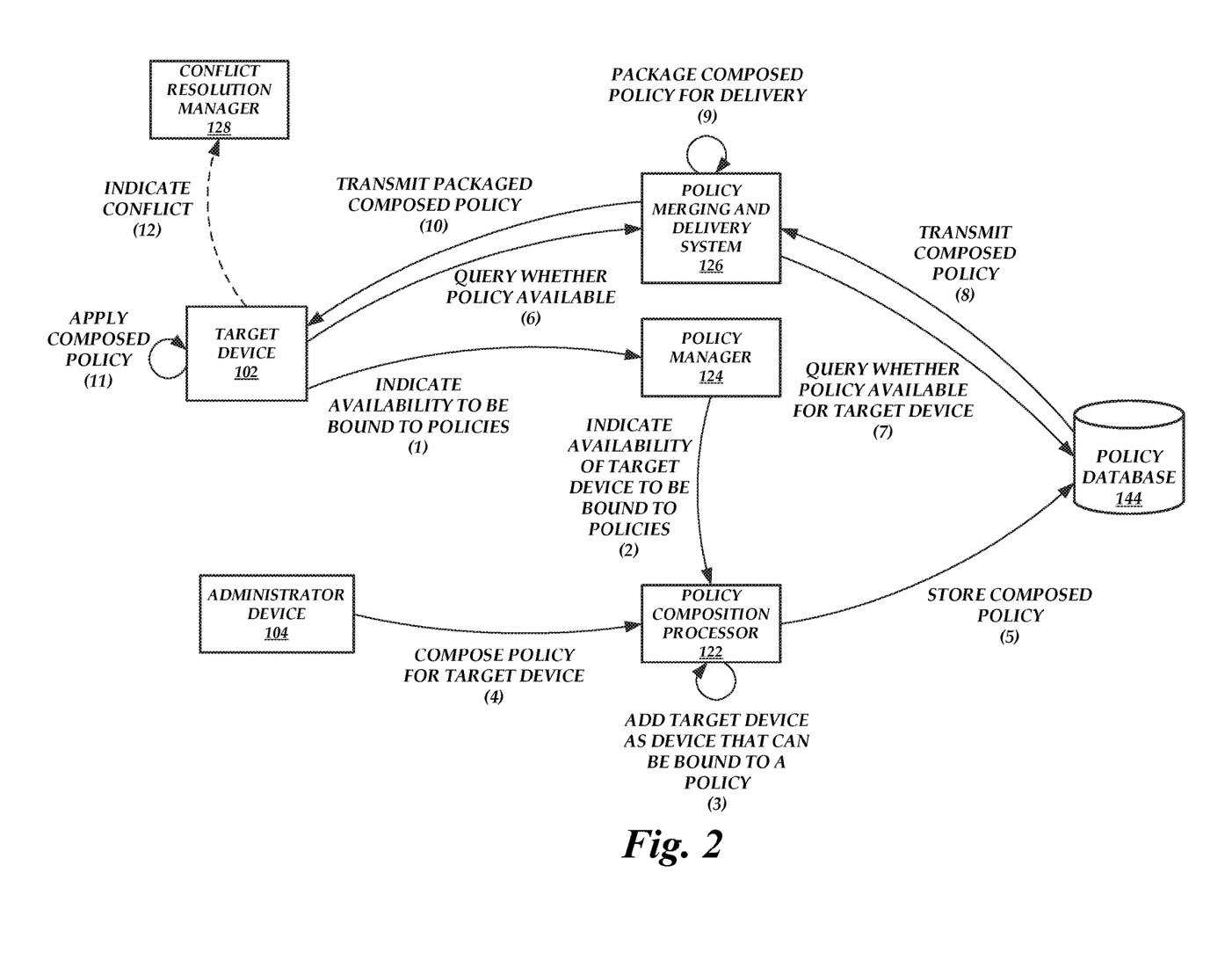
FIG. 2 is a block diagram of the policy management environment of FIG. 1 illustrating the operations performed by the components of the policy management environment to manage the application of policies to target devices, according to one embodiment.

FIG. 2 is a block diagram of the policy management environment 100 of FIG. 1 illustrating the operations performed by the components of the policy management environment 100 to manage the application of policies to target devices 102, according to one embodiment. As illustrated in FIG. 2, the target device 102 may transmit to the policy manager 124 an indication of an availability to be bound to policies at (1). This transmission may occur when a new computing resource is created, for example when a virtual machine is created, or when changes to existing computing resources (or groups of computing resources) occur. The indication can include attributes of the target device 102. In response to the indication, the policy manager 124 can transmit to the policy composition processor 122 an indication of an availability of the target device 102 to be bound to policies at (2). The policy composition processor 122 can use the indication to add the target device 102 as a device that can be bound to a policy at (3). For example, the target device 102 can be added to a list of available target devices that can be selected by an administrator to bind target devices to policies.

The administrator device 104 can provide information to the policy composition processor 122 to compose a policy for the target device 102 at (4). For example, the administrator device 104 can provide an ordered sequence of plugins, custom instructions, and/or references to other policies to compose the policy. The administrator device 104 can further select the target device 102 from a list of target devices to bind the target device 102 to the composed policy. Once composition of the policy is complete, the policy composition processor 122 stores the composed policy as a policy file in the policy database 144 at (5).

After the target device 102 has indicated an availability to be bound to policies, the target device 102 can periodically query whether policies are available for application. For example, the target device 102 can query the policy merging and delivery system 126 whether a policy is available for the target device 102 at (6). The policy merging and delivery system 126 can query the policy database 144 to determine whether a policy is available for the target device 102 at (7). Because the administrator device 104 composed a policy bound to the target device 102, the policy database 144 includes a policy file pertaining to the target device 102. Thus, the policy database 144 transmits the composed policy to the policy merging and delivery system 126 at (8).

The policy merging and delivery system 126 can package the composed policy for delivery at (9). For example, the retrieved policy file can be included in a JSON object. If multiple policy files are available for the target device 102, the policy merging and delivery system 126 may merge the policy files to remove redundancies, resolve conflicts, take advantage of identified efficiencies, change updated portions of one or more policies, and/or the like. The multiple policy files can be combined into a single policy file, can be separate policy files packaged into a single message, or can be separate policy files that are packaged in separate messages. Once the composed policy is packaged, the policy merging and delivery system 126 transmits the packaged composed policy to the target device 102 at (10).

Once the packaged composed policy is received, the target device 102 applies the composed policy at (11). The target device 102 can provide information on the results of the application of the composed policy to the policy management system 106. For example, in some embodiments, the results indicate that a conflict occurred. Thus, the target device 102 can transmit to the conflict resolution manager 128 an indication that a conflict occurred at (12). The conflict resolution manager 128 can then automatically take remedial action or generate a notification indicating the conflict that is transmitted to the administrator device 104 requesting instructions from the administrator device 104.

Example Block Diagram for Using Feedback to Merge Policies

Figure 3:
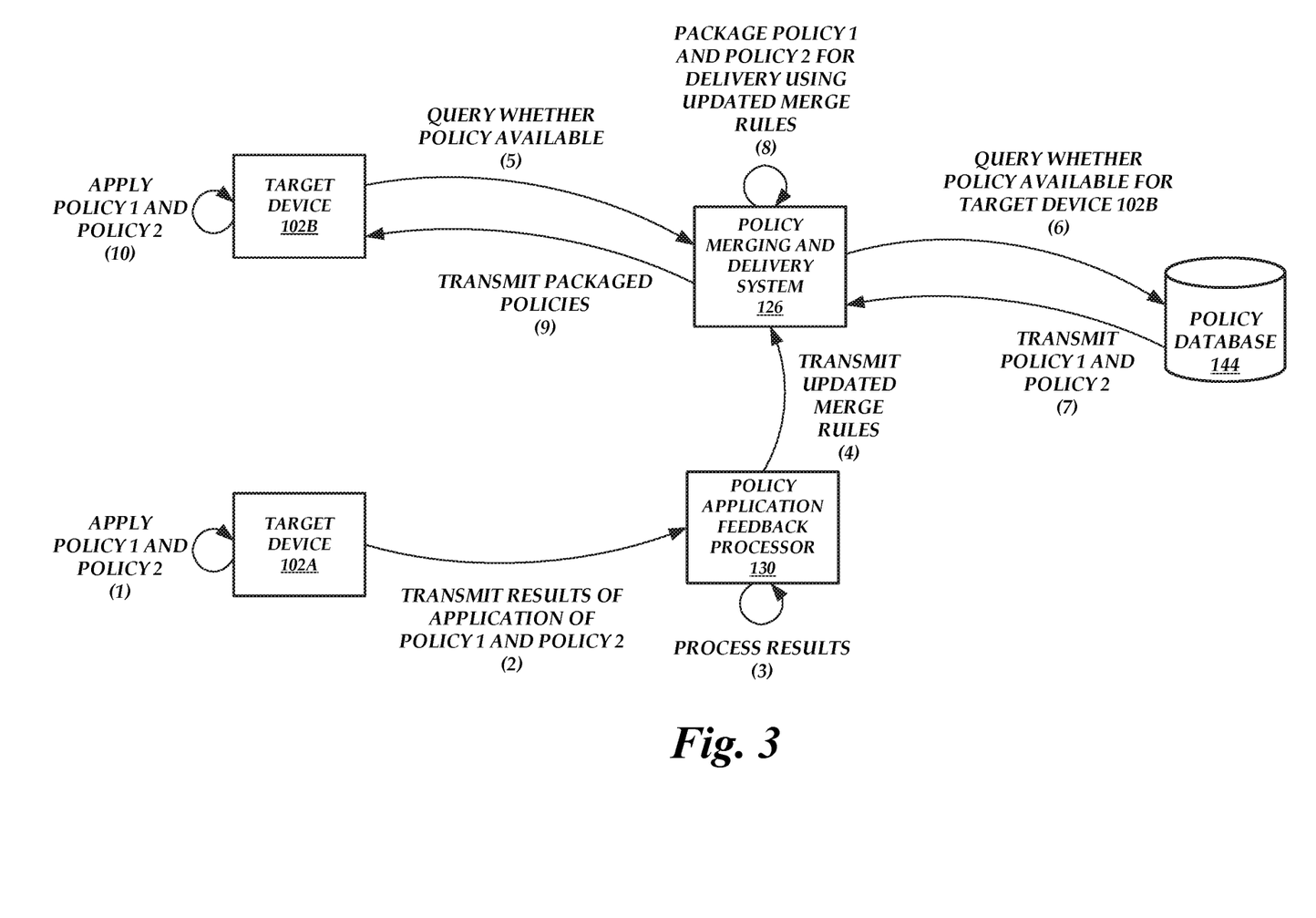
FIG. 3 is a block diagram of the policy management environment of FIG. 1 illustrating the operations performed by the components of the policy management environment to use feedback from target devices to merge policies, according to one embodiment.

FIG. 3 is a block diagram of the policy management environment 100 of FIG. 1 illustrating the operations performed by the components of the policy management environment 100 to use feedback from target devices 102 to merge policies, according to one embodiment. As illustrated in FIG. 3, a target device 102A applies policy 1 and policy 2 at (1). Policies 1 and 2 may have been received from the policy merging and delivery system 126 at a previous time. The target device 102A then transmits to the policy application feedback processor 130 results of the application of policy 1 and policy 2 at (2).

In an embodiment, the target device 102A applied policy 2 after policy 1. Other target devices 102 may have applied policy 1 after policy 2 at a previous time and provided application results to the policy application feedback processor 130 as well. The policy application feedback processor 130 may process results received from the target device 102A and/or other target devices 102 at (3). As a result of the processing, the policy application feedback processor 130 may generate an updated set of merge rules. For example, the merge rules may specify a sequence that policies should be applied in because the specified sequence results in improved performance (e.g., faster policy application times, reduced CPU usage during application of policies, reduced memory usage during application of policies, etc.). The policy application feedback processor 130 can transmit to the policy merging and delivery system 126 the updated merge rules at (4).

A target device 102B may have already indicated an availability to be bound to policies and may query the policy merging and delivery system 126 to determine whether a policy is available for the target device 102B at (5). The policy merging and delivery system 126 may then query the policy database 144 to determine whether a policy is available for the target device 102B at (6). The target device 102B may also be bound to policies 1 and 2 and therefore the policy database 144 transmits the policies 1 and 2 to the policy merging and delivery system 126 at (7).

The policy merging and delivery system 126 can package policy 1 and policy 2 for delivery to the target device 102B using the updated merge rules at (8). Thus, the policy merging and delivery system 126 may specify a policy application sequence in which policy 2 is applied after policy 1. The policy merging and delivery system 126 can transmit the packaged policies to the target device 102B at (9). The target device 102B can then apply policy 1 followed by policy 2 at (10).

Example Policy Management Routine

Figure 4:
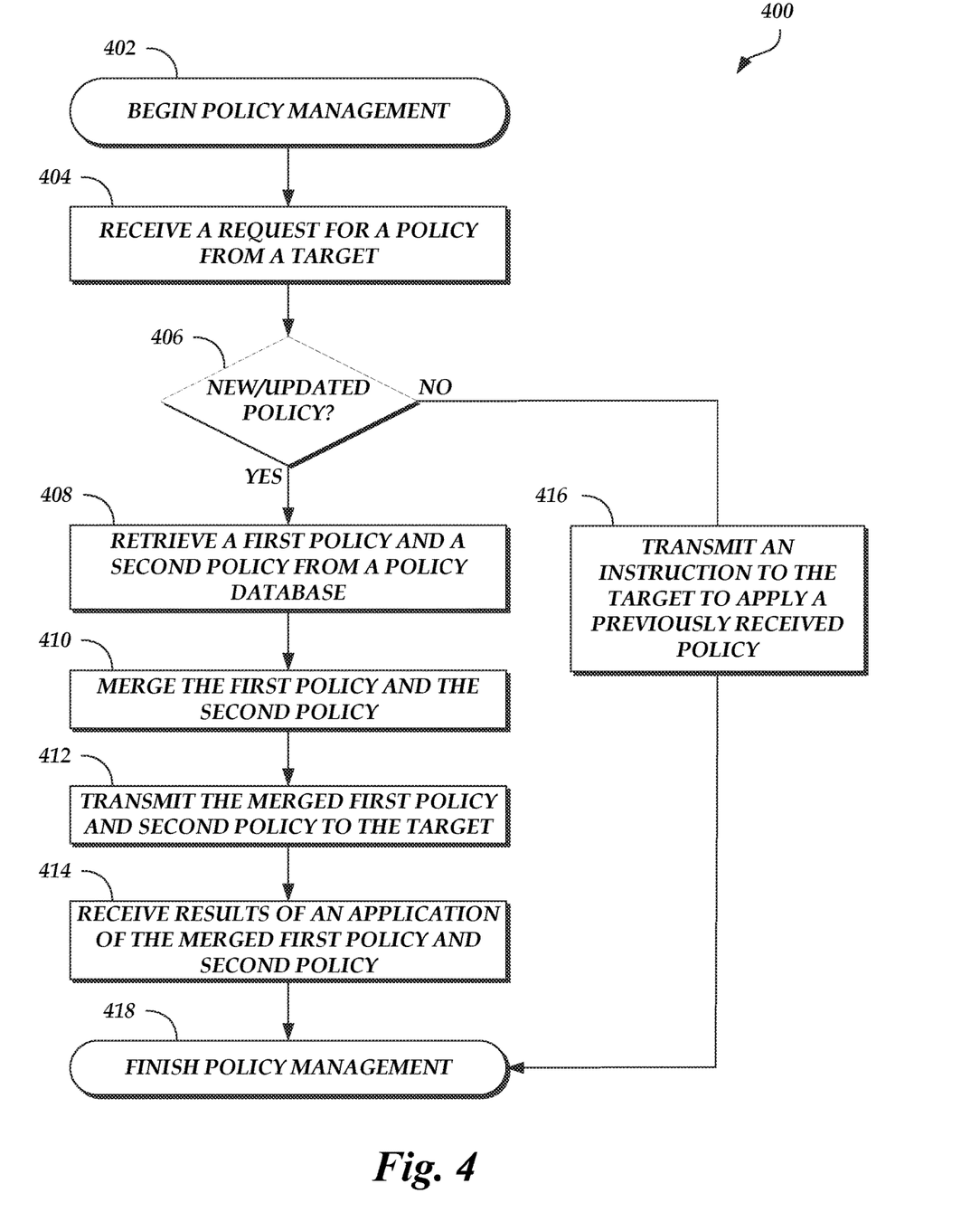
FIG. 4 is a flow diagram depicting a routine for managing policies illustratively implemented by a policy management system, according to one embodiment.

FIG. 4 is a flow diagram depicting a policy management routine 400 illustratively implemented by a policy management system, according to one embodiment. As an example, the policy management system 106 of FIG. 1 can be configured to execute the policy management routine 400. The policy management routine 400 begins at block 402.

At block 404, a request for a policy is received from a target. For example, the target may have previously indicated that the target is available to be bound to a policy. The target may periodically send the policy request.

At block 406, a determination is made as to whether a new or updated policy is available for the target. If no new or updated policy is available for the target, the policy management routine 400 proceeds to block 416. Otherwise, if a new or updated policy is available for the target, the policy management routine 400 proceeds to block 408.

At block 408, a first policy and a second policy are retrieved from a policy database. For example, the target may be bound to the first policy and the second policy.

At block 410, the first policy and the second policy are merged. For example, merging can include removing duplicates, resolving conflicts, using target feedback to determine a sequence of policies, and/or the like.

At block 412, the merged first policy and second policy are transmitted to the target. For example, the merged first policy and second policy can be packaged into a JSON object and transmitted to the agent 112.

At block 414, results of an application of the merged first and second policy are received. The results can indicate that the application of both policies was successful or that the application of one or both policies failed. Remedial actions can be taken if one or both applications failed. After the results of the application are received, the policy management routine 400 is complete, as shown at block 418.

At block 416, an instruction is transmitted to the target to apply a previously received policy. For example, because no new or updated policy is available for the target, the target can use the merged policies previously received and reapply the merged policies. After the instruction is transmitted, the policy management routine 400 is complete, as shown at block 418.

Example Network Page Viewed on a Administrator Device

Figure 5:
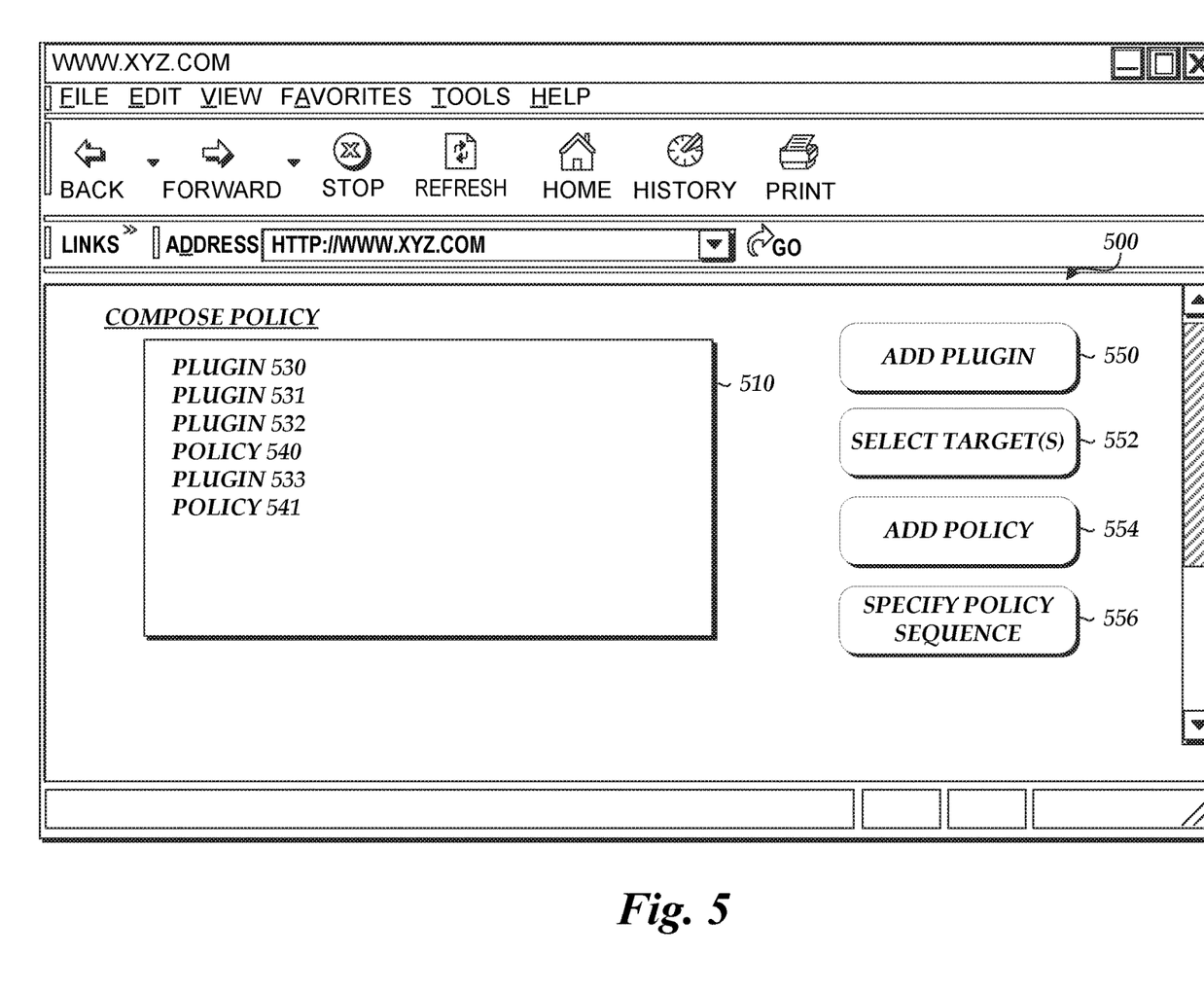
FIG. 5 illustrates an example of a representation of a network page displayed on an administrator device, such as the administrator device of FIG. 1, according to one embodiment.

FIG. 5 illustrates an example of a representation of a network page 500 (e.g., content page, web page, etc.) displayed on an administrator device, such as the administrator device 104, according to one embodiment. The network page 500 may be displayed within the user interface of the browser application running on the administrator device 104. The network page 500 may be displayed when an administrator is composing a policy.

As illustrated in FIG. 5, the network page 500 includes a text field 510 and buttons 550, 552, 554, and 556. The text field 510 may include text identifying the set of instructions that define a policy being composed. For example, the text field 510 can include plugins 530-533 and policies 540-541. Plugins 530-533 may each be the same type of plugin or one or more of the plugins 530-533 may be different types of plugins. The plugins 530-533 can be pre-defined or administrator-defined. The policies 540-541 may be references to policies other than the policy being composed. Thus, the policies 540-541 may be nested policies. The sequence of plugins 530-533 and policies 540-541 may govern the sequence in which the plugins 530-533 and policies 540-541 are executed and applied, respectively, when the policy being composed is applied to a target device 102. Accordingly, plugin 532 may be executed before the policy 540 is applied. Likewise, policy 540 may be applied before plugin 533 is executed. In some embodiments, the output of one instruction (e.g., plugin, custom instruction, and/or referenced policy) can be used as an input parameter by another instruction that follows in sequence. As an illustrative example, the output of the plugin 530 may be used by the agent 112 as an input parameter when executing the plugin 532.

Additional plugins can be added to text field 510 by typing in the text field 510 or by selecting the button 550 (e.g., "Add Plugin"). Additional policies can be referenced in text field 510 by typing in the text field 510 or by selecting the button 554 (e.g., "Add Policy"). For example, selection of the button 554 may result in the network page 500 displaying a window (not shown) listing an identification of policy files stored in the policy database 144. The administrator may then select the desired policy for inclusion in the policy being composed.

As described above, the administrator can bind target devices 102 to policies being composed. For example, selection of the button 552 may result in the network page 500 displaying a window (not shown) listing target devices 102 that have indicated an availability to be bound to policies. Alternatively, selection of the button 552 may result in the network page 500 displaying a window (not shown) listing only those target devices 102 that have indicated an availability to be bound to policies and that are compatible with the plugins 530-533 and policies 540-541 included in the policy being composed. Alternatively, the administrator may use an interface to specify targets that are tagged or marked with a particular group to be bound to a particular policy.

Furthermore, the administrator can specify a sequence in which policies are to be applied to the target device 102 via selection of the button 556. Selection of the button 556 may cause the network page 500 to display a window (not shown) listing policy files stored in the policy database 144 and a request to indicate whether the policy should be applied before and/or after the policy being composed (and/or the exact order that the policy should be applied relative to other policies in a sequence). Alternatively, selection of the button 556 may cause the network page 500 to display a window (not shown) listing only a subset of the policy files stored in the policy database 144. The subset may correspond to those policies that are bound to the target device 102 that is being bound to the policy being composed.

Example Policy Merging

Figure 6:
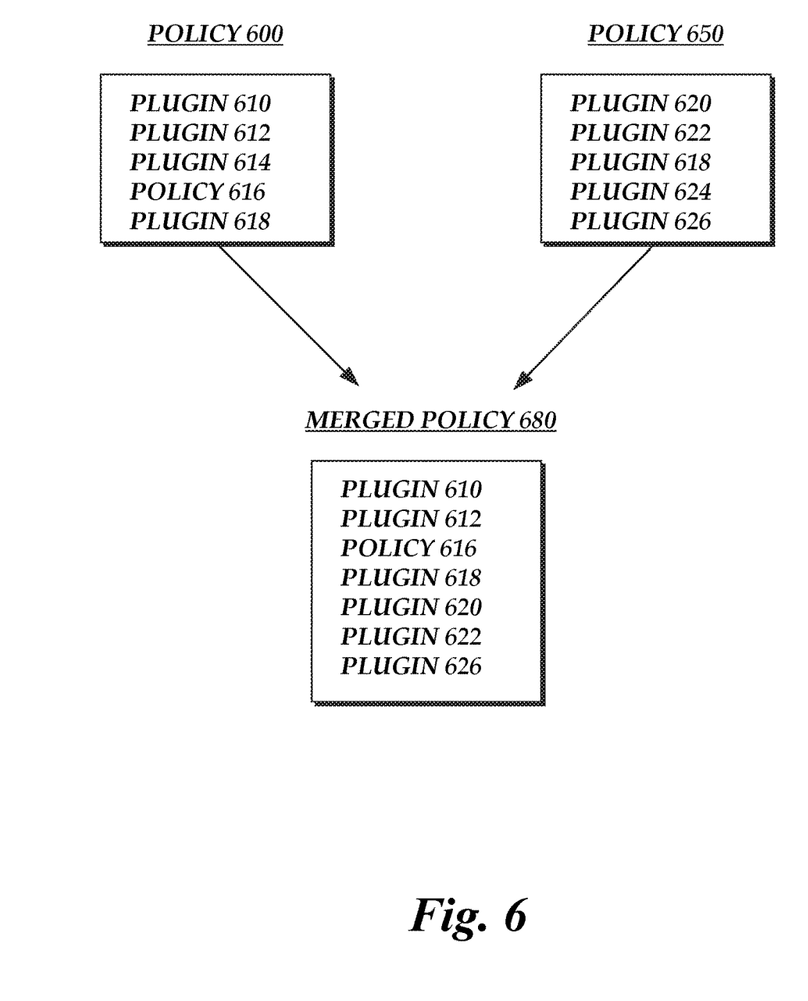
FIG. 6 illustrates an example merging of two policies, according to one embodiment.

FIG. 6 illustrates an example merging of two policies 600 and 650, according to one embodiment. For example, the policy 600 may include plugin 610, plugin 612, plugin 614, policy 616, and plugin 618 in the order depicted in FIG. 6. The policy 650 may include plugin 620, plugin 622, the plugin 618, plugin 624, and plugin 624 in the depicted order. Thus, the policy 600 and the policy 650 may both include the plugin 618. It may not be necessary to execute the plugin 618 twice, however. For example, execution of the plugin 618 may cause a target device 602 to install an application and therefore a second execution of the plugin 618 would be redundant. Accordingly, the policy merging and delivery system 126 can remove the second instance of the plugin 618 during the merging process. For example, merged or effective policy 680 is a result of the policy merging and delivery system 126 merging the policies 600 and 650. As illustrated in FIG. 6, the merged policy 680 only includes a single instance of the plugin 618. If, on the other hand, each execution of the plugin 618 would produce different results, then the policy merging and delivery system 126 may include both instances of the plugin 618 in the merged policy 680.

In addition, the plugin 614 and the plugin 624 may be conflicting plugins such that execution of the plugin 614 causes the target device 102 to perform a first action and execution of the plugin 624 causes the target device 102 to revert the first action. For example, execution of the plugin 614 may cause the target device 102 to install an application and execution of the plugin 624 may cause the target device 102 to uninstall the same application. Thus, the policy merging and delivery system 126 constructs the merged policy 680 such that the merged policy 680 does not include the plugin 614 or the plugin 624.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
    a computing system implemented by one or more computing devices in a service provider environment, the one or more computing devices configured with specific computing device executable instructions for:
        processing a request for a policy received from a first physical computing device over a network, the first physical computing device including an agent for communicating with the computing system;
        determining that a first policy and a second policy are available for the first physical computing device, wherein the first policy and the second policy have not been previously transmitted to the first physical computing device;
        merging the first policy and the second policy to form an effective policy, wherein the effective policy comprises at least a portion of a first set of executable instructions that define the first policy and at least a portion of a second set of executable instructions that define the second policy;
        transmitting the effective policy to the first physical computing device; and
    processing results of an application of the effective policy received from the first physical computing device.

2. The computer-implemented method of claim 1, wherein merging the first policy and the second policy further comprises:
    determining that the first set of executable instructions includes a first executable instruction and that the second set of executable instructions includes the first executable instruction;
    removing the first executable instruction from the second set of executable instructions to form a third set of executable instructions; and
    combining the first set of executable instructions and the third set of executable instructions to form the effective policy.

3. The computer-implemented method of claim 1, wherein merging the first policy and the second policy further comprises:
    determining that the first set of executable instructions includes a first executable instruction that, when executed, causes a first action and that the second set of executable instructions includes a second executable instruction that, when executed, causes a second action that reverts the first action;
    removing the first executable instruction from the first set of executable instructions to form a third set of executable instructions;
    removing the second executable instruction from the second set of executable instructions to form a fourth set of executable instructions; and
    combining the third set of executable instructions and the fourth set of executable instructions to form the effective policy.

4. The computer-implemented method of claim 1 further comprising:
    determining updated merge rules based on the processing of the results of the application of the effective policy;
    processing a request for a policy received from a second physical computing device over the network;
    determining that the first policy and the second policy are available for the second physical computing device;
    merging the first policy and the second policy to form a fourth policy using the updated merge rules; and
    transmitting the fourth policy to the second physical computing device.

5. The computer-implemented method of claim 1 further comprising:
    determining that the first physical computing device is bound to a fourth policy;
    determining that the first physical computing device is incompatible with the fourth policy; and
    merging the first policy, the second policy, and not the fourth policy to form the effective policy.

6. A system comprising:
    a data store configured to store a first policy file and a second policy file; and a computing system in a service provider environment comprising at least one hardware processor and at least one memory, wherein the at least one memory includes instructions that, when executed, cause the computing system to:
process a request for a policy received from a first physical computing device over a network;
determine that the first physical computing device is bound to the first policy and the second policy;
merge the first policy and the second policy to form an effective policy, wherein the effective policy comprises at least a portion of a first set of executable instructions that define the first policy and at least a portion of a second set of executable instructions that define the second policy;
transmit the effective policy to the first physical computing device; and
process results of an application of the effective policy received from the first physical computing device.

7. The system of claim 6, wherein the instructions, when executed, further cause the computing system to:
determine that the first set of executable instructions includes a first executable instruction and that the second set of executable instructions includes the first executable instruction;
remove the first executable instruction from the second set of executable instructions to form a third set of executable instructions; and
combine the first set of executable instructions and the third set of executable instructions to form the effective policy.

8. The system of claim 6, wherein the instructions, when executed, further cause the computing system to:
determine that the first set of executable instructions includes a first executable instruction that, when executed, causes a first action and that the second set of executable instructions includes a second executable instruction that, when executed, causes a second action that reverts the first action;
remove the first executable instruction from the first set of executable instructions to form a third set of executable instructions;
remove the second executable instruction from the second set of executable instructions to form a fourth set of executable instructions; and
combine the third set of executable instructions and the fourth set of executable instructions to form the effective policy.

9. The system of claim 6, wherein the instructions, when executed, further cause the computing system to:
determine updated merge rules based on the processing of the results of the application of the effective policy;
process a request for a policy received from a second physical computing device over the network;
determine that the first policy and the second policy are available for the second physical computing device;
merge the first policy and the second policy to form a fourth policy using the updated merge rules; and
transmit the fourth policy to the second physical computing device.

10. The system of claim 6, wherein the instructions, when executed, further cause the computing system to:
determine that the first physical computing device is bound to a fourth policy;
retrieve the fourth policy from the policy data store;
determine that the first physical computing device is incompatible with the fourth policy; and
merge the first policy, the second policy, and not the fourth policy to form the effective policy.

11. The system of claim 6, wherein the instructions, when executed, further cause the computing system to:
determine that the first set of executable instructions includes a first executable instruction that, when executed, causes a first action and that the second set of executable instructions includes a second executable instruction that, when executed, causes a second action that reverts the first action;
determine that the first set of executable instructions are more recent than the second set of executable instructions;
remove the second executable instruction from the second set of executable instructions to form a third set of executable instructions; and
combine the first set of executable instructions and the third set of executable instructions to form the effective policy.

12. The system of claim 6, wherein the instructions, when executed, further cause the computing system to at least one of quarantine the first physical computing device, detach the first physical computing device from the network, or transmit an instruction to the first physical computing device that causes the first physical computing device to uninstall an application in response to the processing of the results of the application of the effective policy.

13. The system of claim 6, wherein the instructions, when executed, further cause the policy management system to:
process a request to modify the first policy received from a second physical computing device associated with an administrator;
determine, based on login credentials of the administrator, that the administrator is not authorized to modify the first policy; and
deny the request to modify the first policy.

14. The system of claim 6, wherein the instructions, when executed, further cause the computing system to:
determine that the first set of executable instructions are updated;
modify the effective policy to include at least a portion of the updated first set of executable instructions; and
transmit the modified effective policy to the first physical computing device.

15. A non-transitory computer-readable medium including stored thereon executable program code that directs one or more computing devices to perform operations when executed by a computing system operating on the one or more computing devices in a service provider environment, the operations comprising:
processing a request for a policy received from a target device;
determining that the target device is bound to a first policy and a second policy;
merging the first policy and the second policy to form an effective policy, wherein the effective policy comprises at least a portion of a first set of executable instructions that define the first policy and at least a portion of a second set of executable instructions that define the second policy;
transmitting the effective policy to the target device; and
processing results of an application of the effective policy received from the target device.

16. The non-transitory computer-readable medium of claim 15, wherein the operations further comprise:
determining updated merge rules based on the processing of the results of the application of the effective policy;

processing a request for a policy received from a second target device;

determining that the first policy and the second policy are available for the second target device;

merging the first policy and the second policy to form a fourth policy using the updated merge rules; and transmitting the fourth policy to the second target device.

17. The non-transitory computer-readable medium of claim 15, wherein the operations further comprise:

determining that the target device is bound to a fourth policy;

determining that the target device is incompatible with the fourth policy; and merging the first policy, the second policy, and not the fourth policy to form the effective policy.

18. The non-transitory computer-readable medium of claim 15, wherein the operations further comprise:

determining that the first set of executable instructions includes a first executable instruction that, when executed, causes a first action and that the second set of executable instructions includes a second executable instruction that, when executed, causes a second action that reverts the first action;

determining that the first set of executable instructions are more recent than the second set of executable instructions;

removing the second executable instruction from the second set of executable instructions to form a third set of executable instructions; and combining the first set of executable instructions and the third set of executable instructions to form the effective policy.

19. The non-transitory computer-readable medium of claim 15, wherein the operations further comprise performing at least one of quarantining the target device, detaching the target device from a network, transmitting a notification to an administrator device, or transmitting an instruction to the target device that causes the target device to uninstall an application in response to the processing of the results of the application of the effective policy.

20. The non-transitory computer-readable medium of claim 15, wherein the target device comprises a physical computing device.

* * * * *